United States Patent
Tsai

[11] Patent Number: 6,105,733
[45] Date of Patent: Aug. 22, 2000

[54] BRAKE MECHANISM FOR CYCLES

[76] Inventor: Shih Fan Tsai, P.O. Box 63-99, Taichung, Taiwan

[21] Appl. No.: 09/392,547

[22] Filed: Sep. 9, 1999

[51] Int. Cl.[7] .................................. B62L 3/00; B62L 1/14
[52] U.S. Cl. ...................................... 188/24.12; 188/24.22
[58] Field of Search ............................... 188/24.11–24.21

[56]  References Cited

U.S. PATENT DOCUMENTS

| | | | |
|---|---|---|---|
| 5,562,185 | 10/1996 | Chen | 188/24.12 |
| 5,740,889 | 4/1998 | Tsai | 188/24.19 |
| 5,788,020 | 10/1996 | Tseng | 188/24.12 |

*Primary Examiner*—Chris Schwartz

[57]  ABSTRACT

A brake mechanism includes a pair of brake arms each having a middle portion pivotally secured to a cycle at a shaft and each having a brake shoe secured to the lower portion. The lower portion of the brake arm includes a protrusion having a head. A ring is rotatably secured to the shaft and has a spring rod engaged with the protrusion of the brake arm for biasing the brake shoe away from the wheel rim of the cycle. A screw is engaged with the ring for rotating the ring relative to the tube and to adjust the biasing force of the spring rod against the brake shoe.

1 Claim, 3 Drawing Sheets

BRAKE MECHANISM FOR CYCLES

BACKGROUND OF THE INVENTION

1. Field of the Invention

The present invention relates to a brake mechanism, and more particularly to a brake mechanism for cycles.

2. Description of the Prior Art

The closest prior art of which the applicant is aware is his prior U.S. Pat. No. 5,740,889 to Tsai and comprises a spring rod for applying a spring biasing force against the brake shoes. However, the brake shoes are attached to the middle portion of the brake arm, and the spring rod is engaged with one end of the brake arm such that the spring rod may not directly act onto the brake shoes.

The present invention has arisen to mitigate and/or obviate the afore-described disadvantages of the conventional brake mechanisms for cycles.

SUMMARY OF THE INVENTION

The primary objective of the present invention is to provide a brake mechanism including a spring rod that may directly act on the brake shoe of the cycles.

In accordance with one aspect of the invention, there is provided a brake mechanism for a cycle, the brake mechanism comprising a pair of brake arms each including a middle portion pivotally secured to the cycle at a shaft and each including a lower portion having a brake shoe secured thereto, the lower portion of the brake arm including a protrusion extended therefrom, and a ring secured to the cycle at the shaft, the ring including a spring rod extended therefrom and engaged with the protrusion of the brake arm for applying a biasing force against the brake shoe.

The protrusion of the brake arm includes a head formed thereon for engaging with the spring rod and for preventing the spring rod from being disengaged from the brake arm. An adjusting device is further provided for rotating the ring relative to the shaft and to adjust the biasing force of the spring rod against the brake shoe.

A plate includes a tube extended therefrom and engaged on the shaft, the ring is rotatably engaged on the tube of the plate, and means for rotating the ring relative to the tube of the plate and to adjust the biasing force of the spring rod against the brake shoe. The plate includes an ear extended therefrom, and a screw threaded to the ear and engaged with the ring and to rotate the ring relative to the tube when the screw is threaded relative to the ear of the plate. A spacer is further engaged on the tube of the plate and engaged with the ring, and means for securing the spacer and the ring in place.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
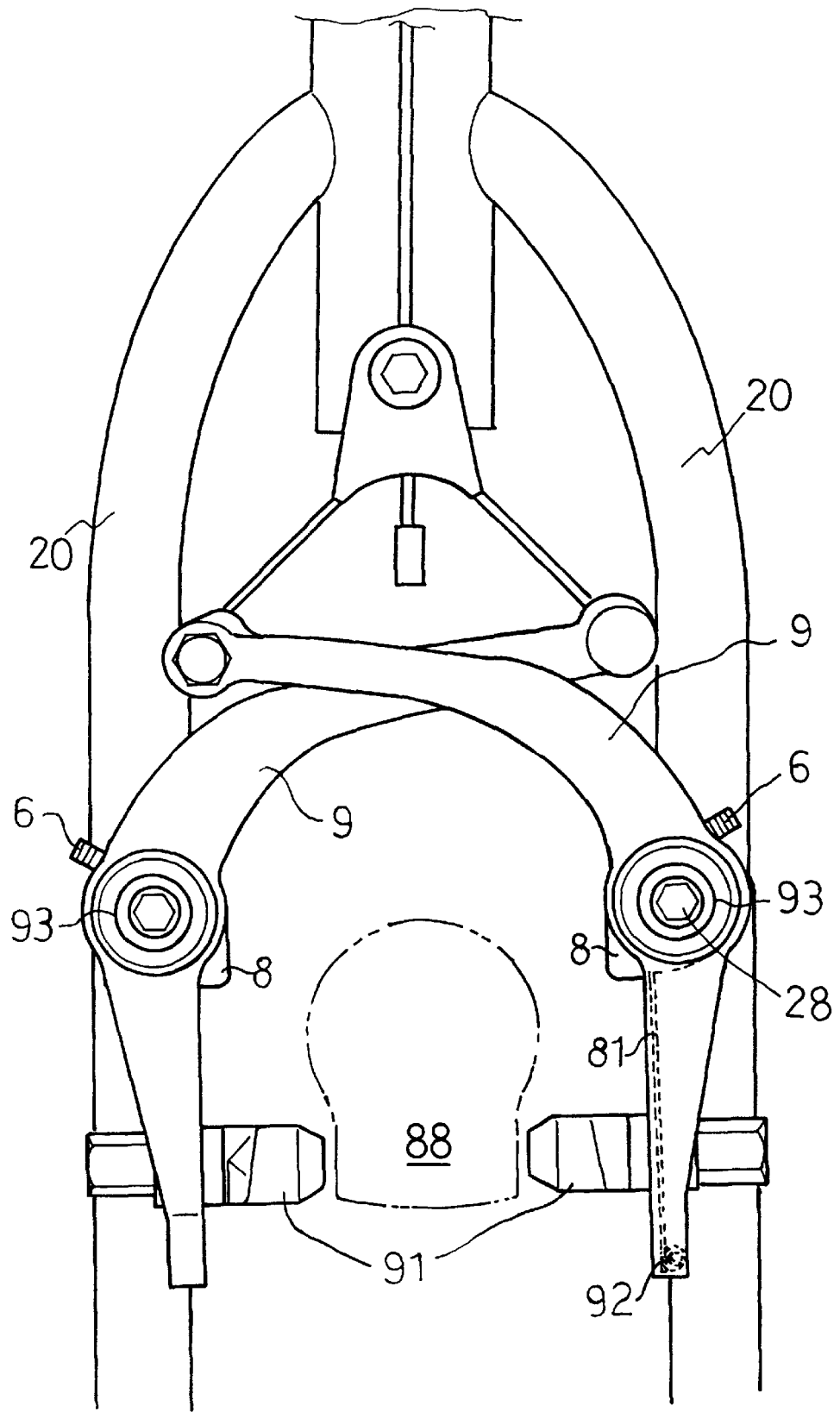
FIG. 1 is a plane view of a brake mechanism in accordance with the present invention.
Figure 2:
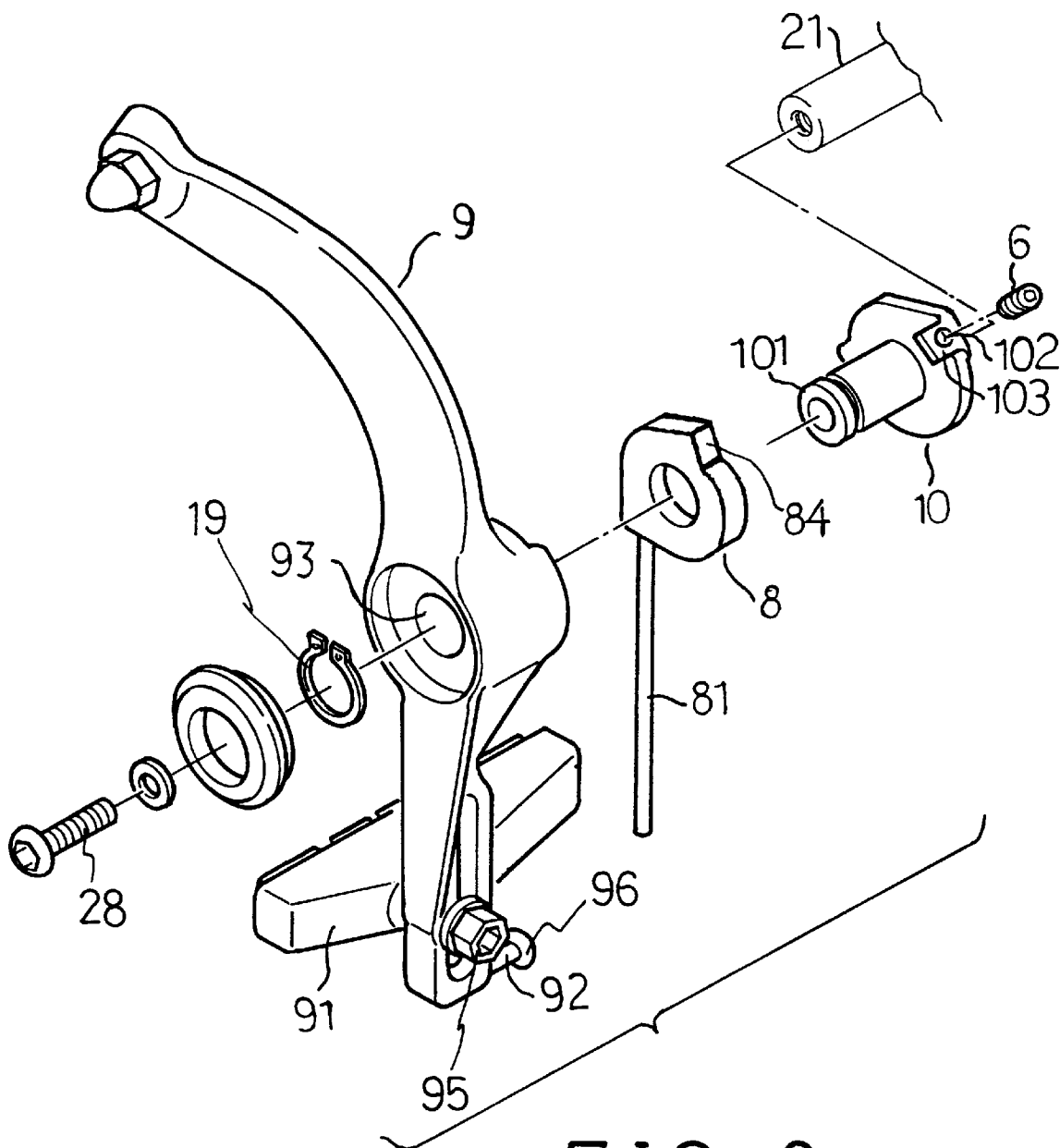
FIG. 2 is an exploded view of the brake mechanism.

Referring to the drawings, a brake mechanism in accordance with the present invention comprises a pair of brake arms 9 each having an orifice 93 formed in the middle portion thereof for receiving a shaft 21 that extends from the front or rear fork 20 of the cycles. A fastener 28 is engaged with the brake arm 9 and engaged with the shaft 21 for rotatably securing the brake arm 9 to the cycles. The brake arms 9 each includes a brake shoe 91 secured to the bottom portion thereof by a fastener 95 and each includes a protrusion 92 extended therefrom and having a head 96 formed thereon.

Figure 3:
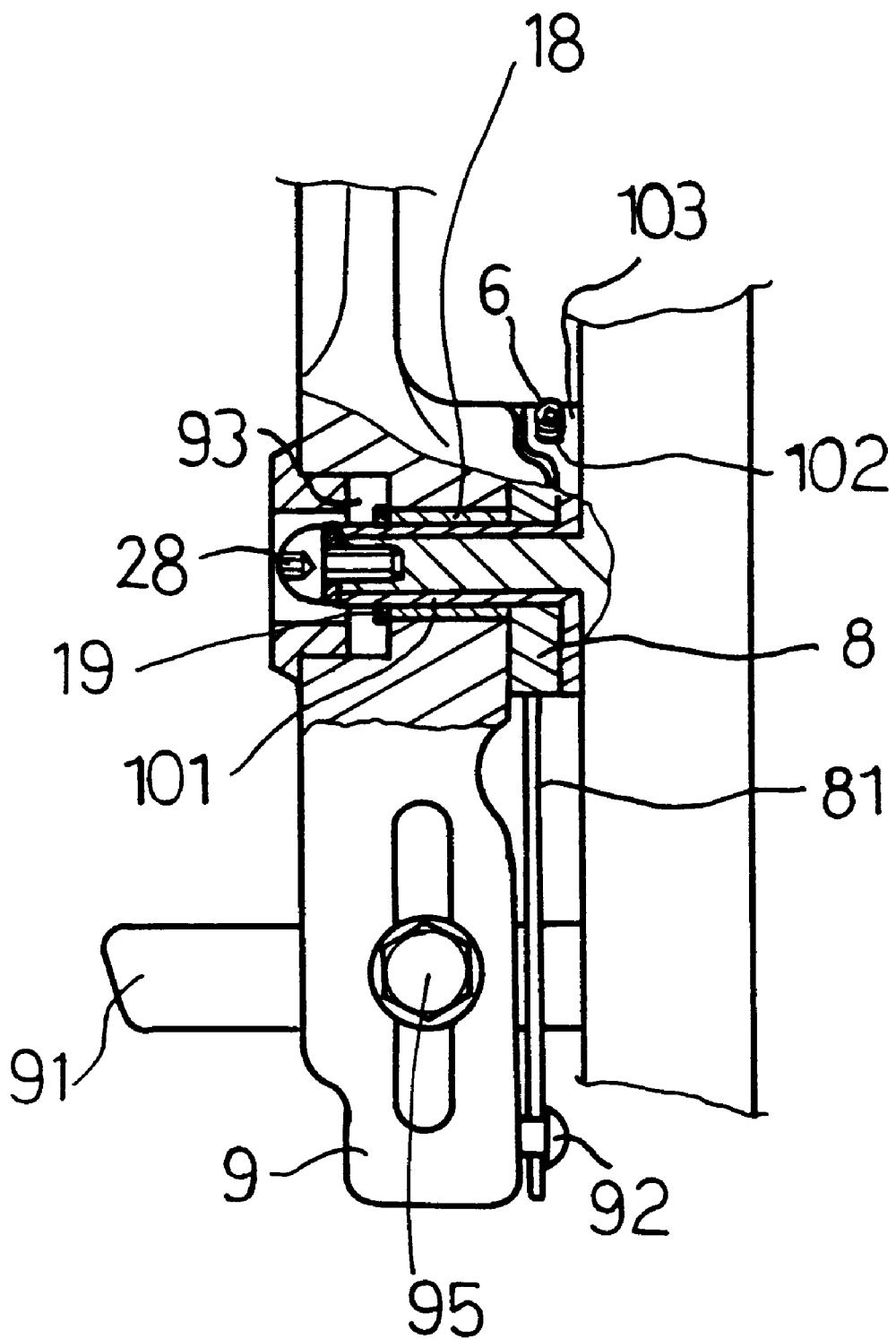
FIG. 3 is a partial plane view of the brake mechanism, in which a portion of the brake mechanism is cut off for showing the structure of the brake mechanism.

A plate 10 includes a tube 101 extended therefrom and engaged on the shaft 21 of the cycles, and includes an ear 103 extended laterally therefrom and preferably parallel to the tube 101 and having a screw hole 102 formed therein for engaging with a screw 6 that may be threaded relative to the ear 103 of the plate 10. The plate 10 may further be solidly secured to the cycles by key engagement or the like. A ring 8 is rotatably engaged on the tube 101 of the plate 10 and includes a spring rod 81 extended therefrom and engaged with the protrusion 92 of the brake arm 9. The ring 8 includes a flat surface or a seat 84 formed therein for engaging with the screw 6. A spacer 18 and a retaining ring 19 (FIG. 3) may be used to secure the ring 8 in place. The head 96 of the protrusion 92 of the brake arm 9 may be used for preventing the spring rod 81 from being disengaged from the brake arm 9.

In operation, the spring rod 81 of the ring 8 may directly apply a force against the brake shoe 91 by the protrusion 92 of the brake arm 9 for biasing the brake shoes 91 away from the wheel rim 88 (FIG. 1). The screw 6 may engage with the seat 84 of the ring 8 to adjust the spring force of the spring rod 81 against the protrusion 92 and thus the brake shoe 91.

Alternatively, without the plate 10 and the tube 101, the ring 8 may be directly and rotatably attached onto the shaft 21 of the cycles, and the cycles may include an ear 103 for supporting the adjusting screw 6.

Accordingly, the brake mechanism in accordance with the present invention includes a spring rod that may directly act on the brake shoe of the cycles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A brake mechanism for a cycle, the cycle including a shaft extended therefrom, said brake mechanism comprising:

a plate adapted to be pivotally secured to the cycle at the shaft, said plate including a tube extended therefrom and including an ear extended therefrom;

a ring rotatably engaged on said tube of said plate and including a spring rod extended therefrom;

a pair of brake arms each including a middle portion pivotally engaged on said tube of said plate, said brake arms each including a lower portion having a brake shoe secured thereto, said lower portion of said brake arm including a protrusion extended therefrom, said protrusion of said brake arm including a head formed thereon, said brake arms each including an upper portion, said brake shoes being moved toward and away from each other when said upper portions of said brake arms are moved toward and away from each other respectively;

said spring rod being engaged with said protrusion of said brake arm for applying a biasing force against said brake shoe, said head of said protrusion of said brake arm being engaged with said spring rod for preventing said spring rod from being disengaged from said brake arm;

means for rotating said ring relative to said tube of said plate and to adjust said biasing force of said spring rod against said brake shoe, said rotating means including a screw threaded to said ear of said and engaged with said ring for rotating said ring relative to said tube when said screw is threaded relative to said ear of said plate;

a spacer engaged on said tube of said plate and engaged with said ring; and means for securing said spacer and said ring in place.

* * * * *